United States Patent [19]

Nose et al.

[11] 3,812,407

[45] May 21, 1974

[54] CAPACITOR

[75] Inventors: Kiyoo Nose, Kusatsu; Yoshiji Kokura, Akasaki; Nobuo Hizaki, Kusatsu; Shigeyoshi Nishikawa, Minakuchi; Yoshihiki Shinbo, Kusatsu, all of Japan

[73] Assignee: Nichicon Capacitor, Limited, Kyoto, Japan

[22] Filed: Jan. 29, 1973

[21] Appl. No.: 327,723

[30] Foreign Application Priority Data
Jan. 31, 1972 Japan.................................. 47-11108

[52] U.S. Cl..................................... 317/258, 252/64
[51] Int. Cl........................................... H01g 3/195

[58] Field of Search................ 317/258; 252/63, 64; 29/25.42

[56] References Cited
UNITED STATES PATENTS
| | | | |
|---|---|---|---|
| 1,622,809 | 3/1927 | Rodman | 317/258 X |
| 2,410,714 | 11/1946 | Clark | 317/258 X |
| 2,983,856 | 5/1961 | Martin | 317/258 |

*Primary Examiner*—E. A. Goldberg

[57] ABSTRACT

A capacitor having a laminated dielectric formed of layers of paper and a synthetic resin and then impregnated with an aromatic hydrocarbon oil.

2 Claims, 12 Drawing Figures

CAPACITOR

This invention relates to an improved capacitor of a type consisting of laminated layers of metal, paper and synthetic resin and impregnated with oil, and a method of making same.

Recently, synthetic resin films such as polypropylene films have been brought into practice for use as the dielectric layers of so-called paper capacitors, together with or in place of paper layers, and such tendency seems to be accelerated in the near future. On the other hand, there are many kinds of impregnating materials such as mineral oil, polybutene oil, dioctyl phthalate and diphenyl chloride, for paper capacitors, and diphenyl chloride has been known as the best one which can provide superior paper capacitors. In the case of synthetic resin dielectric layers, however, diphenyl chloride has exhibited a basic disadvantage of insufficient impregnating property. Moreover, it has now caused a difficult social problem of public poisoning, and should be cancelled or substituted with other preferable material.

Therefore, an object of this invention is to provide an improved capacitor impregnated with a novel material having superior impregnating property and electric characteristics but no disadvantage as the above.

According to this invention, the capacitor is consisting of a multiplex of laminated layers of metal, paper and synthetic resin and impregnated with aromatic hydrocarbon oil having specific characteristics as defined in the appended claims.

Although alkyl benzene oil has already been known as an impregnating material for capacitors, it has not yet been sufficient for being used as a substitute for diphenyl chloride, because it has not been used in the optimum condition of composition. After a number of tests and measurements, the inventors have found that aromatic hydrocarbon oil can exhibit superior effect as the impregnating material of paper capacitors when its physical characteristics and chemical composition are appropriately controlled.

Now the invention will be described in detail with reference to the accompanying drawings.

In the drawings:

FIG. 1 is a schematic sectional diagram representing a laminated structure of the capacitor in which this invention is to be embodied;

FIGS. 2-1 and 2—2 are diagrams representing tensile strengths of synthetic resin films impregnated with various materials at various temperatures;

FIGS. 6-1 and 6-2 are diagrams representing gas absorbing characteristics of various materials measured by the apparatus of FIG. 5;

Figure 1:
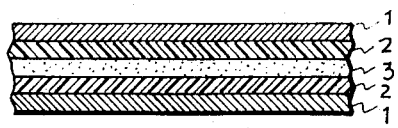
FIGS. 3-1 and 3-2 are diagrams representing elongations of the films of FIGS. 2-1 and 2—2.

A typical capacitor construction of the impregnated type is shown in section in FIG. 1 and includes electrode layers 1, a pair of plastic films 2, such as polypropylene and an intermediate layer 3 of paper.

During development of the invention, a number of aromatic hydrocarbon compositions have been tested. Ten of them are submitted for an aid of explanation of the invention, as the under.

MONOCYCLIC COMPOSITIONS

SAMPLE $A_1$: Monoalkyl benzene, having 10 to 12 carbon atoms in the alkyl group.

SAMPLE $A_2$: Mixture of 90 percent monoalkyl benzene and 10 percent dialkyl benzene, having 10 to 12 carbon atoms in each alkyl group.

SAMPLE $A_3$: Mixture of 35 percent monoalkyl benzene, 15 percent dialkyl benzene and 50 percent trialkyl benzene, having 10 to 12 carbon atoms in each alkyl group.

POLYCYCLIC COMPOSITIONS

SAMPLE $B_1$: Trialkyl naphthalene, having 4 to 6 carbon atoms in each alkyl group.

SAMPLE $B_2$: Trialkyl naphthalene, having 2 to 4 carbon atoms in each alkyl group.

SAMPLE $B_3$: Trialkyl naphthalene, having 1 to 3 carbon atoms in each alkyl group.

SAMPLE $B_4$: 1-phenyl 1-xylyl ethane.

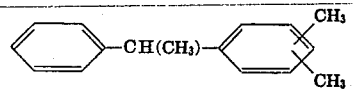

SAMPLE $B_5$: 1,2-di(1-phenyl) ethyl 4,5,dimethyl benzene

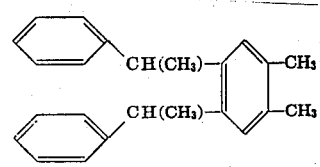

MIXTURE OF MONO- AND POLYCYCLIC COMPOSITIONS

SAMPLE $C_1$: Mixture of 40 percent monoalkyl benzene having 10 to 12 carbon atoms in the alkyl group and 60 percent trialkyl naphthalene having 2 to 4 carbon atoms in each alkyl group.

SAMPLE $C_2$: Mixture of 15 percent monoalkyl benzene, 40 percent dialkyl benzene plus trialkyl benzene, 40 percent biphenyl alkyl and 5 percent 2-hydro 3-alkyl indene plus 1,2,3,4-tetrahydro naphthalene, having 10 to 14 carbon atoms in each alkyl group.

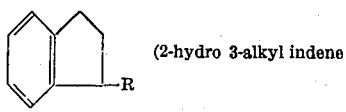

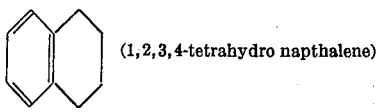

The physical characteristics of these samples were measured as shown in Table 1. Three of these samples, $A_3$, $B_1$ and $C_2$ were selected as typical ones of the three groups of composition and various impregnating properties and electrical characteristics were measured thereon. For the purpose of comparison, diphenyl trichloride, dioctyl phthalate, mineral oil, and polybutene oil, which will be referred hereinunder by symbols $R_1$, $R_2$, $R_3$ and $R_4$ respectively, were treated at the same time. The physical characteristics of these materials were measured as shown in Table 2.

TABLE 1

| Sample | Viscosity (centistokes) at 15° C. | Viscosity (centistokes) at 75° C. | Flash point (° C.) | Fluidization point (° C.) | Mean molecular weight | Boiling point (° C.) |
|---|---|---|---|---|---|---|
| A1 | 20.0 | 3.0 | 139 | Below −60. | 280 | Above 280. |
| A2 | 35.0 | 4.3 | 132 | Below −50. | 282 | Do. |
| A3 | 74.6 | 9.6 | 164 | −35 | 350 | Above 350. |
| B1 | 68.0 | 5.2 | 165 | −27.5 | 269 | Above 300. |
| B2 | 15.5 | 3.5 | 142 | −50 | 220 | Do. |
| B3 | 14.0 | 3.3 | 134 | Below −50. | 190 | Do. |
| B4 | 9.0 | 2.4 | 154 | −50 | 220 | Above 290. |
| B5 | 200.0 | 7.0 | 170 | −26 | 345 | Above 340. |
| C1 | 20.0 | 3.3 | 132 | Below −50. | 210 | Above 290. |
| C2 | 15.0 | 2.9 | 166 | Below −70. | 254 | Above 320. |

TABLE 2

| Sample | Fluidization point (° C.) | Flash point (° C.) | Amount of evaporation (percent) | Stability (acid number) P (KOH mg./g.) | Dielectric power factor at 80° C. | Volumetric resistivity (ohm-cm.) | Viscosity at 30° C. (centistokes) |
|---|---|---|---|---|---|---|---|
| A3 | −35 | 164 | 0 | 0.05 | $1 \times 10^{-5}$ | $6 \times 10^{15}$ | 58 |
| B1 | −27.5 | 165 | 0.01 | 0.05 | $2 \times 10^{-4}$ | $4 \times 10^{15}$ | 30 |
| C2 | (¹) | 166 | 0.035 | 0.02 | $1 \times 10^{-5}$ | $1 \times 10^{15}$ | 9.4 |
| R1 | −17.5 | 176 | 0.048 | 0.003 | $2.4 \times 10^{-3}$ | $1.5 \times 10^{13}$ | 30 |
| R3 | −32.5 | 135 | 0.219 | 0.14 | $2 \times 10^{-4}$ | $8.1 \times 10^{14}$ | 11.9 |
| R4 | −12.5 | 180 | 0.7 | 0.02 | $6 \times 10^{-4}$ | $1 \times 10^{14}$ | 4,000 |
| Castor oil | −25 | 256 | 0 | 0.66 | $2.2 \times 10^{-2}$ | $8.7 \times 10^{11}$ | 490 |

¹ Below −70.

As shown in Table 2, the aromatic compositions are similar to or better than the known reference materials in the above characteristics and can suufice the condition of impregnating material.

In order to obtain sufficient impregnation of capacitors having synthetic resin films, the impregnating material must have good wetting property on the synthetic resin films. Therefore, contact angles and permeabilities of the samples with respect to a polypropylene film were measured as shown in Table 3. The permeabilities were measured in the following way. Two 12 micron polypropylene films containing acidic clay therebetween were adhered on the bottom of a cylinder having 40 millimeter diameter in which a specific amount of sample material is contained and the time taken by the sample for passing through the film and wetting a half of the area of the acidic clay was measured. As found clearly in Table 3, the aromatic compositions have superior resin permeating property in comparison with the reference materials.

TABLE 3

| Sample | Contact Angle at 20°C (°) | Permeability 80°C (hour) | Permeability 100°C (hour) | Permeability 120°C (hour) |
|---|---|---|---|---|
| A3 | 6 | 10 | 2.2 | 1.2 |
| B1 | 10 | 8.5 | 1.6 | 0.6 |
| C2 | below 4 | 4.8 | 1.1 | 0.4 |
| R1 | 50 | 16 | 4 | 2.4 |
| R2 | 20 | 26 | 4 | 1.3 |
| R3 | below 4 | — | — | — |
| R4 | 34 | 70 | 4.3 | 1.5 |
| Cotton Seed Oil | 28 | — | — | — |

Figures 1, 2:
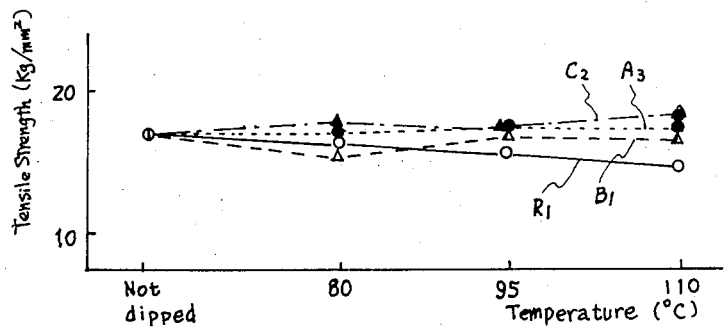
Figure 2:
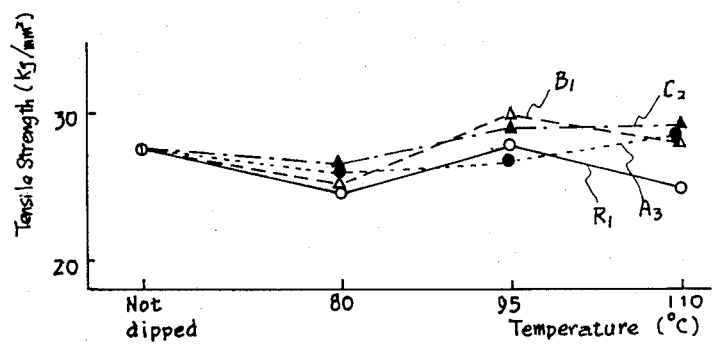
Figures 1, 3:
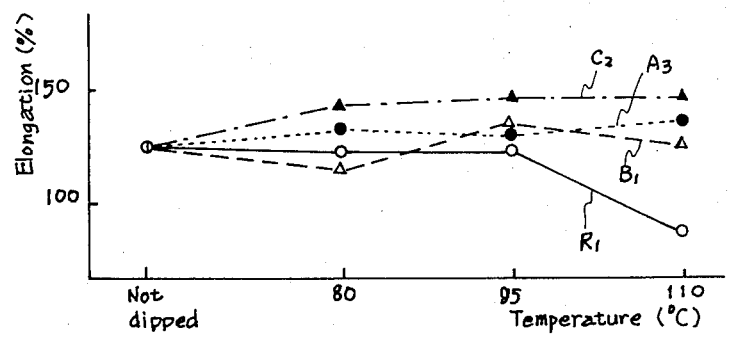
Figures 2, 3:
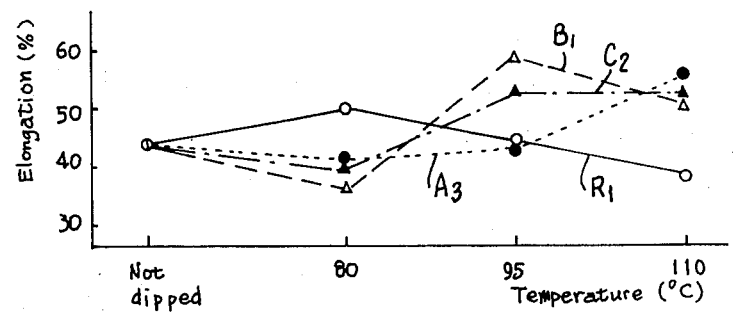

It is generally considered that impregnating materials which have good permeability have high affinity to synthetic resin films and may swell them. Therefore, five polypropylene films which are 18 micron thick, 50 millimeter long and 100 millimeter wide were dipped in each sample of 500 milliliters for 120 hours at various temperatures, and then tensile strength and elongation were measured with a gauge length of 50 millimeters. FIG. 2–1 represents the result of measurement of tensile strength along the lengthwise direction corresponding to the winding direction and FIG. 2—2 represents the same result along the widthwise direction corresponding to the lateral direction. FIGS. 3–1 and 3–2 represent the results of measurement of elongation along the lengthwise and widthwise directions, respectively. As found from these drawings, the aromatic compositions not only have almost no effect to the resin film but also seem better than diphenyl trichloride ($R_1$).

Figure 4:
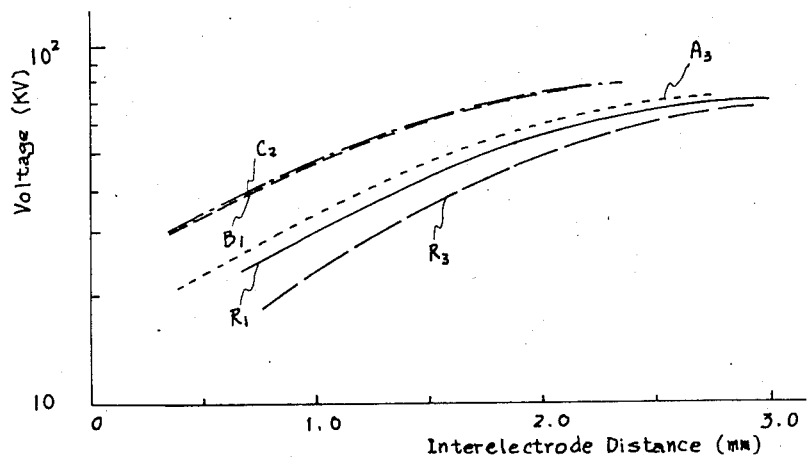
FIG. 4 is a diagram representing breakdown voltages of various impregnating materials.

Breakdown voltages of the samples were measured by setting two spherical electrodes having 12.5 millimeter diameter in the sample oil at variable distance and applying an increasing voltage therebetween. The breakdown voltages were obtained as shown in FIG. 4 with respect to the interelectrode distance. It can be found from this result that the aromatic compositions have rather higher breakdown voltages than diphenyl trichloride ($R_1$) and mineral oil ($R_3$).

Figure 5:
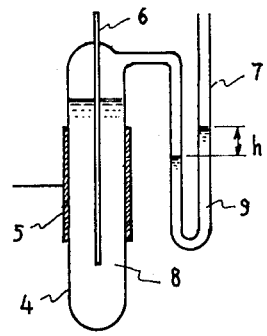
FIG. 5 is a schematic diagram representing an apparatus for measuring gas absorbing characteristics of impregnating materials.
Figures 1, 6:
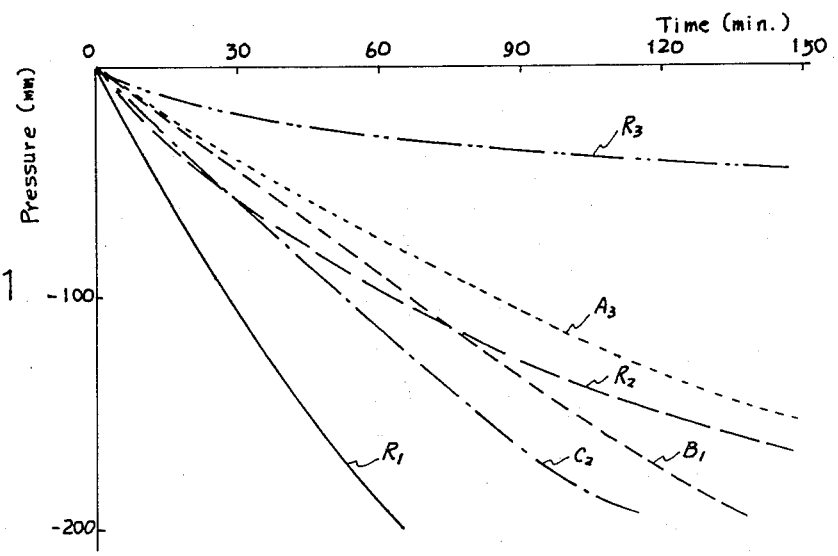
Figures 2, 6:
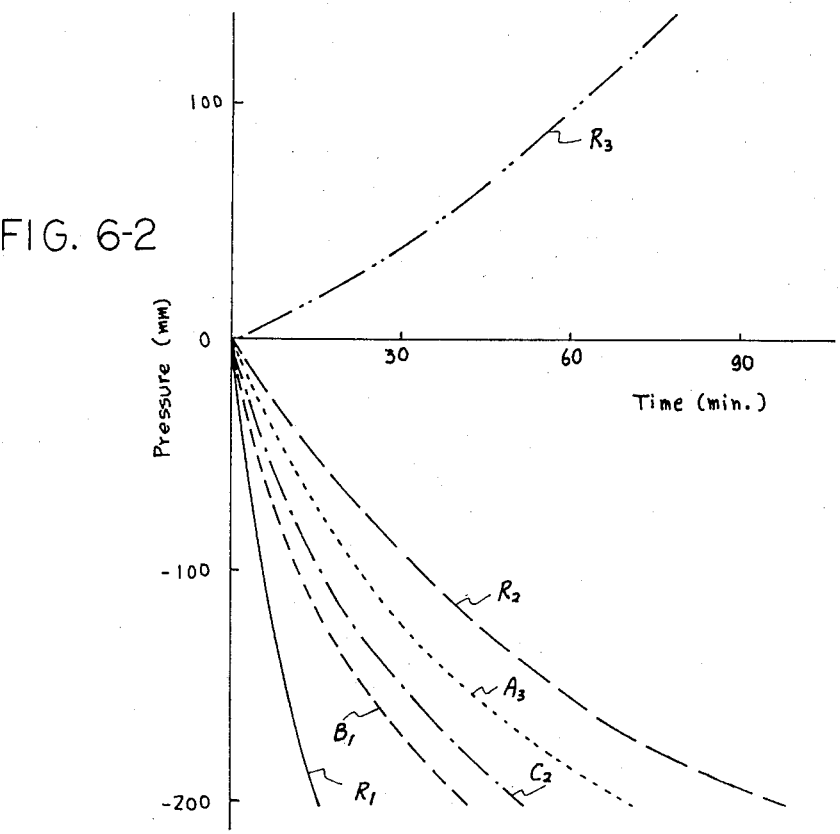

While impregnating materials are generally decomposed by corona discharge between the electrodes of capacitor and produce a gas, it is desirable that this gas is effectively absorbed by the impregnating materials themselves and does not liberate. Therefore, gas absorbing properties of the sample oils were measured by using an apparatus as shown in FIG. 5. In FIG. 5, a glass tube 4 having 10 millimeter diameter is provided with a cylindrical electrode 5 and an exial electrode 6 and also with a U-type manometer 7. Sample oil 8 was sealed in the tube 4 and the same oil was used as a manometer liquid 9. The remaining space in the tube 4 was filled with hydrogen. A specific high voltage was applied between the both electrodes 5 and 6 at a specific temperature and the level difference $h$ of the manometer 7 was read with respect to a lapse of time. FIGS. 6–1 and 6–2 represent the results of this measurement, wherein FIG. 6–1 indicating the result at 8 killovolts and 50° C and FIG. 6–2 indicating the result at 12 killovolts and 140° C. These results indicate that the gas absorbing properties of the aromatic oils are somewhat worse than diphenyl chloride but rather better than mineral oil.

Figure 7:
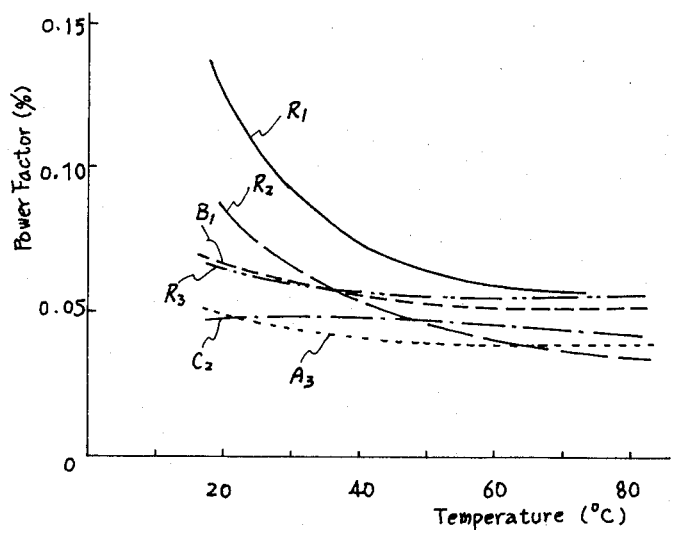
FIG. 7 is a diagram representing dielectric power factors of test capacitors impregnated with various materials at various temperatures.
Figure 8:
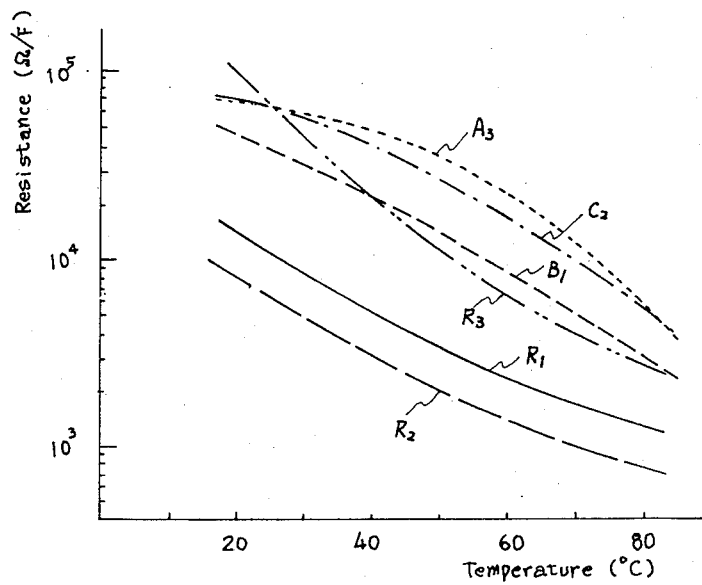
FIG. 8 is a diagram representing insulation resistances of the test capacitors.

For the purpose of effecting a utility test of the sample oils, a model capacitor having 0.3 microfarad electrostatic capacitance and 1,500 volt a.c. rated voltage was prepared and impregnated with the each sample oil. This capacitance is composed of a rolled sandwitch of a pair of electrode layers, a pair of 18 micron polypropylene films and a 17 micon paper layer disposed in the center FIG. 7 shows the result of measurement of dielectric power factors of the test capacitors measured by a Schering bridge at 1,500 volts at various temperatures, and FIG. 8 shows the results of measurement of insulation resistance at 100 volt d.v. applied voltage after one minute. These results clearly indicate that the both power factor and insulation resistance are appreciably improved by the aromatic impregnating compositions.

On the same test capacitor, corona starting voltage and corona closing voltage were measured as shown in Table 4. The values in the table are the means of ten measurements. It can be found from the table that the corona starting voltage has been increased by about 10 to 30 percents at 15° C and 15 to 40 percents at 50° C by the aromatic compositions from the case of diphenyl trichloride and is almost similar to that of mineral oil, and that the corona closing voltage has also been increased.

TABLE 4

| Sample | Corona starting voltage (volt) | | Corona closing voltage (volt) | |
|---|---|---|---|---|
| | 15°C | 50°C | 15°C | 50°C |
| A3 | 3000 | 3450 | 1133 | 1100 |
| B1 | 3200 | 3800 | 1200 | 2150 |
| C2 | 3600 | 4100 | 1383 | 1950 |
| R1 | 2800 | 3000 | 1766 | 1650 |
| R2 | 2566 | 3100 | 433 | 1000 |
| R3 | 3400 | 3900 | 800 | 950 |
| R4 | 400 | 533 | 400 | 400 |

Breakdown voltage measurement was carried out on ten specimens with the each sample oil and a result was obtained as shown in Table 5.

TABLE 5

| Sample | Min. | Max. | Mean |
|---|---|---|---|
| C2 | 10000 | 10700 | 10500 |
| R1 | 7300 | 8000 | 7700 |

Table 5 indicates that the breakdown voltage has been increased by about 30 percent by the aromatic composition $C_2$ from the case of diphenyl trichloride.

Figure 9:
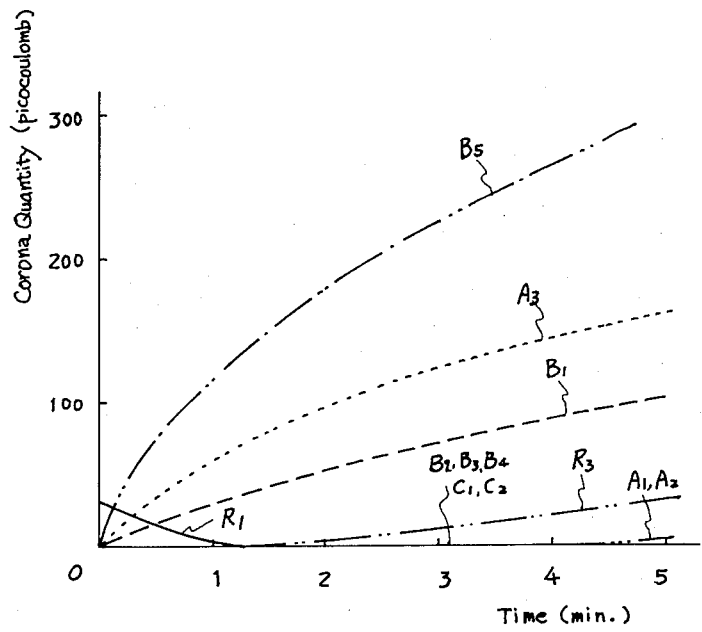
FIG. 9 is a diagram representing corona discharge characteristics of the test capacitors.

At last, an a.c. voltage of 3,300 volts, which corresponds to a potential gradient 63 volts/micron, was applied to the each test capacitor and a quantity of electrocoty discharged by corona discharge was plotted with respect to a lapse of time, as shown in FIG. 9. In a practical, capacitors are required not to increase an amount of corona discharge with a lapse of time. Therefore, those samples other than $A_3$, $B_1$ and $B_5$ are found to suffice this condition.

As described above, all of the samples of aromatic hydrocarbon composition exhibited superior features on the most of important characteristics but some of them, that is, Samples $A_3$, $B_1$ and $B_5$, were inferior on the corona discharge characteristics as shown in FIG. 9. This difference can be distinguished in Table 1 by thise characteristics, viscosity at 15° C, mean molecular weight, fluidization point and boiling point. More specifically, for the most preferable aromatic hydrocarbon impregnating materials, viscosity must be lower than 40 centistokes, mean molecular weight must be 180 to 320, fluidixation point must be lower than −40° C and boiling point must be higher than 280° C.

Although the above limitation of the physical characteristics is essential to this invention, it can also be found throughout the accompanying drawings that the most superior aromatic impregnating materials are those of C-group, that is, mixtures of monocyclic and polycyclic compositions and the least superior ones are those in A-group, that is, monocyclic compositions.

Though the above tests were carried out on the capacitors having sandwitched dielectric layers consisting of a pair of polypropylene films and a paper layer disposed therebetween, it should be self-evident that same result could be obtained on the other dielectric layer constructions consisting of synthetic resin layers and paper layers.

What is claimed is:

1. A capacitor comprising a pair of electrodes and a dielectric layer between said electrodes and consisting of synthetic resin and paper layers, wherein said capacitor is impregnated with a non-halogenated, non-sulphonated aromatic hydrocarbon oil having viscosity lower than 40 centistokes at 15° C, mean molecular weight of 180 to 320, fluidization point lower than −40° C and boiling point higher than 280° C.

2. A capacitor comprising a pair of electrodes and a dielectric layer between said electrodes and consisting of synthetic resin and paper layers, wherein said capacitor is impregnated with an aromatic hydrocarbon oil having viscosity lower than 40 centistokes at 15° C, mean molecular weight of 180 to 320, fluidization point lower than −40° C and boiling point higher than 280° C, said aromatic hydrocarbon oil containing at the same time at least one of monocyclic compounds and at least one of polycyclic compounds.

* * * * *